United States Patent
Heinzl et al.

(10) Patent No.: US 7,306,092 B1
(45) Date of Patent: Dec. 11, 2007

(54) TRANSPORT SYSTEM FOR SMALL COMPONENTS

(75) Inventors: Alfred Heinzl, Munich (DE); Heinz Stadler, Munich (DE)

(73) Assignee: Tyco Electronics Logistics AG, Steinach (CH)

( * ) Notice: Subject to any disclaimer, the term of this patent is extended or adjusted under 35 U.S.C. 154(b) by 0 days.

(21) Appl. No.: 09/857,353

(22) PCT Filed: Dec. 1, 1999

(86) PCT No.: PCT/DE99/03812

§ 371 (c)(1),
(2), (4) Date: Sep. 5, 2001

(87) PCT Pub. No.: WO00/34156

PCT Pub. Date: Jun. 15, 2000

(30) Foreign Application Priority Data

Dec. 4, 1998 (DE) ................................ 198 56 102

(51) Int. Cl.
*B65G 29/00* (2006.01)

(52) U.S. Cl. .............................. 198/867.12; 198/803.8; 198/803.15; 198/853; 198/803.14; 198/867.1

(58) Field of Classification Search ................ 198/853, 198/803.8, 803.14, 803.15, 867.11, 867.12, 198/867.1
See application file for complete search history.

(56) References Cited

U.S. PATENT DOCUMENTS

| | | | | |
|---|---|---|---|---|
| 2,702,442 A * | 2/1955 | Wallen | ...................... | 43/57.1 |
| 2,932,825 A * | 4/1960 | Vaughan, Jr. | ................ | 198/131 |
| 3,129,814 A * | 4/1964 | Cheh et al. | .................... | 206/56 |
| 3,171,535 A * | 3/1965 | Harris | ........................ | 198/131 |
| 3,286,817 A * | 11/1966 | Brigham | ...................... | 198/179 |
| 3,312,117 A * | 4/1967 | Gritt | ............................ | 74/250 |
| 3,517,803 A * | 6/1970 | Frompovicz et al. | ......... | 206/56 |
| 3,788,450 A * | 1/1974 | Tschunt et al. | ............. | 198/131 |
| 4,004,682 A * | 1/1977 | Schuler | ....................... | 198/852 |
| 4,060,978 A * | 12/1977 | McBain et al. | ................ | 59/78 |
| 4,138,011 A * | 2/1979 | Lapeyre | ...................... | 198/844 |
| 4,263,837 A * | 4/1981 | Tassie | ............................ | 89/34 |
| 4,461,073 A * | 7/1984 | Harringer et al. | ............. | 29/741 |
| 4,586,601 A * | 5/1986 | Hodlewsky | .............. | 198/690.1 |
| 4,611,710 A * | 9/1986 | Mitsufuji | ............... | 198/803.01 |
| 4,629,063 A * | 12/1986 | Hodlewsky et al. | ........ | 198/853 |
| 4,678,425 A * | 7/1987 | Gibbemeyer | ................ | 425/522 |
| 4,684,012 A * | 8/1987 | Feddersen | .............. | 198/803.01 |
| 4,703,920 A * | 11/1987 | Grabbe et al. | ................ | 269/37 |
| 4,729,471 A | 3/1988 | Tuns et al. | | |
| 4,741,432 A * | 5/1988 | Dekko | ...................... | 198/803.8 |
| 4,884,696 A * | 12/1989 | Peleg | ......................... | 209/545 |

(Continued)

FOREIGN PATENT DOCUMENTS

DE 3240912 5/1983

(Continued)

*Primary Examiner*—Douglas A Hess
(74) *Attorney, Agent, or Firm*—Baker & Daniels LLP (57) ABSTRACT

A system for transporting small components, generally electrical components, arranged in a row comprising an arbitrary number of chain links. The components are accommodated within a cavity present in the chain links. The cavity is defined by at least two walls, at least one of which must be rigid, while the wall located opposite thereof is a resilient wall.

20 Claims, 7 Drawing Sheets

U.S. PATENT DOCUMENTS

| | | | |
|---|---|---|---|
| 4,936,007 A * | 6/1990 | Larson et al. | 29/559 |
| 4,974,724 A * | 12/1990 | Lapeyre | 198/853 |
| 5,180,150 A * | 1/1993 | Prusak et al. | 269/254 R |
| 5,333,733 A | 8/1994 | Murata | |
| 5,377,819 A * | 1/1995 | Horton et al. | 198/853 |
| 5,501,436 A * | 3/1996 | Miller | 269/47 |
| 5,511,651 A | 4/1996 | Barth | |
| 5,526,936 A | 6/1996 | Matsuzoe | |
| 5,728,023 A * | 3/1998 | Green et al. | 474/206 |
| 5,904,241 A * | 5/1999 | Verdigets et al. | 198/853 |
| 6,003,675 A * | 12/1999 | Maruyama et al. | 206/713 |
| 6,152,807 A * | 11/2000 | Pomerantz | 451/41 |
| 6,273,253 B1 * | 8/2001 | Forster et al. | 206/339 |
| 6,318,544 B1 * | 11/2001 | O'Connor et al. | 198/853 |
| 6,332,539 B2 * | 12/2001 | Maruyama et al. | 206/713 |

FOREIGN PATENT DOCUMENTS

| | | |
|---|---|---|
| DE | 3216572 | 3/1988 |
| DE | 4244640 | 7/1993 |
| DE | 4337811 | 4/1996 |
| DE | 19626505 | 1/1998 |
| EP | 0085837 | 8/1983 |

* cited by examiner

TRANSPORT SYSTEM FOR SMALL COMPONENTS

The invention relates to a transport system for small components, in particular electrical components, which are arranged in series in said transport system.

Such a transport system is known from EP 0 085 837 B1. This known transport system consists of cassettes having a plurality of levels, with a plurality of rod-shaped magazines being received in each level and said magazines each accommodating a series of components. These magazines are movable and, for processing the components, are each removed from the cassette and inserted in the processing tool and, after processing, are received again in an output cassette. For passing an entire cassette from one processing station to the next one, the cassette is shifted to a transportation table or another means of transportation and is moved to the next processing station.

This system, though constituting the latest prior art for transporting small components, still involves some disadvantages. In producing a small component, the time necessary for changing the cassettes between the processing stations and for inserting the magazines into the processing tools still takes a relatively high share.

To make these times less relevant with respect to the entire production time, two processing steps per magazine carrier are carried out in a row at those processing stations where this is possible. However, some processing steps, such as matching of the magnets in the production of relays, have different processing times. In case of such processing steps carried out in a row, the slower one of the two stations thus always determines the clock feed, thereby reducing again the efficiency of two processing units at a magazine carrier.

It is thus the object of the invention to indicate a transport system increasing the efficiency of a production line.

According to the invention, this object is met in that said transport system is designed as form chain having an arbitrary number of chain links and the small components are accommodated in the chain links.

The form chain can be passed from one processing station to next one without a problem, whereby the insertion of cassettes in the processing stations and of the magazines in the clock modules are eliminated. The design of the transport system as form chain provides the additional advantage that differences in the clock time can be compensated by chain loops between the individual processing stations. Due to the fact that one time the first working station and another time the second working station needs a longer clock time, the chain loop arranged therebetween one time becomes shorter and one time longer, without the two working stations impeding each other.

It is expedient to provide only one accommodation cavity per chain link-so that feeding always can be carried out immediately after processing, in contrast to the case with two accommodation cavities where feeding is also dependent on the processing time of the additional component.

The accommodation cavity preferably has a resilient wall through which the component is urged against an opposite rigid wall. Moreover, it is advantageously formed as through opening, permitting access to both sides of the component. For access to both sides, it is advantageous furthermore if the chain links are pivotable about an axle or pin transverse to the direction of insertion of the accommodation cavity. If the form chain is passed in horizontal direction, processing of the components can take place from above, and if processing from the lower side is desired, the form chain is moved in a loop such that the bottom side of the components is directed upwardly. It has turned out as an especially space-saving solution to guide the chain in the processing station in vertical direction so that processing can take place from both sides thereof. The arrangement of the pin transversely to the direction of insertion of the components in the accommodation cavity provides the additional advantage that the loops between the processing stations hang down due to gravity so that there are thus no specific measures necessary for accommodating the buffer loops.

However, it is just as well possible that the chain links are pivotable perpendicularly to the direction of accommodation of the accommodation cavity. This design has the advantage that the chain can be guided horizontally in a bend or a circle and thus can be fed better to processing stations arranged in horizontally staggered manner. This modification also is advantageous for use in small rooms or for guiding the chain through several rooms.

In a slightly more complex embodiment, the chain links are connected via two mutually perpendicular axles so that, with the exception of the increased manufacturing costs and the more complex guiding of the chain, the advantages of the two modifications described hereinbefore are united.

The chain links are inexpensively made by plastics injection molding. The axles or pins between the chain links preferably consist of metal and project laterally beyond the walls of the accommodation cavity. At the projecting ends of the metal pins, the chain links on the one hand can be guided in ideal manner and on the other hand can be fixed exactly in the processing stations. Guiding and fixing on the metal pins has the advantage that no wear occurs on the plastics chain link and no formation of particles takes place which may entail problems in the production of electronic components.

It is expedient if the accommodation cavities at least have the height of the components to be accommodated. In this case, the component may be accommodated completely in the accommodation cavity of the form chain and the form chain, for storage or delivery, may be wound on a spool or bobbin.

Further embodiments and advantageous developments are indicated in the dependent claims.

The invention will be elucidated hereinafter in more detail by way of embodiments shown in the drawings in which.

FIGS. 1 to 4 illustrate a first embodiment of the transport system according to the invention. The transport system consists of a form chain 1 (cf. FIG. 4) composed of a series of chain links 2. Each chain link 2 has an accommodation cavity 3 in which one small component 4 each can be accommodated and fixed. For fixing the small components 4, the chain link has a rigid wall 5 and a resilient wall 6. The resilient wall 6 consists of an outer wall 7 having on the inside thereof a central web 8 extending in the direction of insertion of the small components 4 and having on both sides thereof resilient arms 9 extending therefrom. Between the free ends of the resilient arms 9 and the inside of the outer wall 7 there is thus formed an air gap 10 into which the resilient arms 9 can retract upon accommodation of a small component 4. The resilient arms 9, on the outsides thereof, have a bead 11 facing in the direction of the accommodation cavity 3 and extending in the direction of insertion of the small components 4 on the resilient arms 9. By means of the beads 11 on the resilient arms 9, the small component 4 thus is urged against the opposite rigid wall 5 and fixed. The resilient arms 9 as well as the beads 11 extend over the full height of the accommodation cavity so that the small component to be accommodated can be fixed at all levels. The accommodation cavity 3 is designed as through opening, permitting access to the component from both sides thereof.

Figure 1:
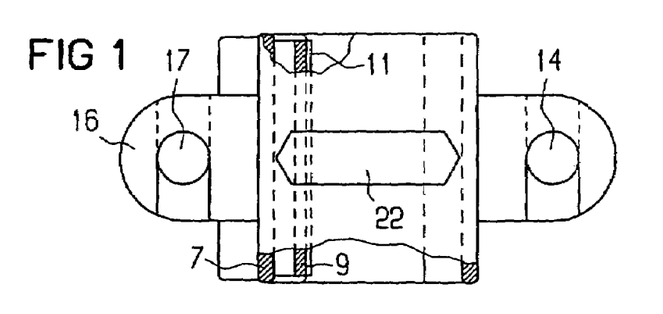
FIG. 1 shows a side view of a chain link according to the invention.
Figure 2:
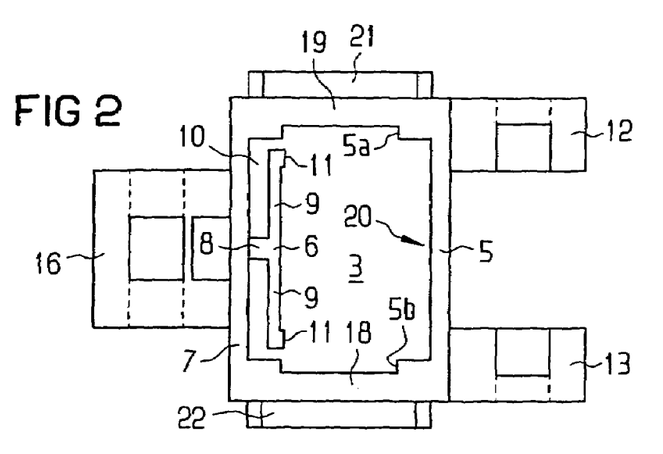
FIG. 2 shows a top plan view of the chain link according to FIG. 1.
Figure 3:
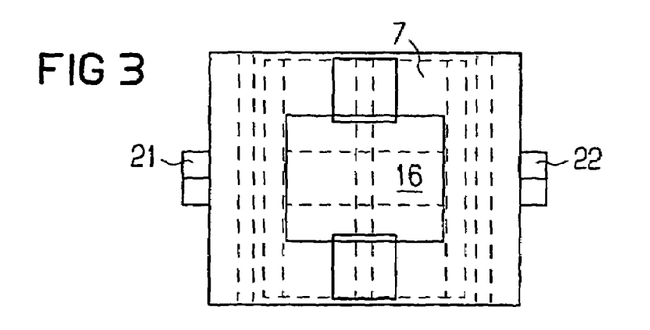
FIG. 3 shows a front view of the chain link according to FIG. 1.

On the outside of rigid wall 5, there are arranged two lateral arms 12 and 13 each having a bore 14 for accommodating a pin for connecting the chain links. On the opposite side of chain link 2, the outside of outer wall 7 has a central arm 16 with a bore 17 arranged thereon which, upon connection of the chain links 2, is slid between the two lateral arms 12 and 13 and is connected thereto by insertion of the common pin 15. The width of the central arm 16 is matched to the spacing between the two lateral arms 12, 13 such that the chain links still can be pivoted well about the connecting pin 15, while however axial movement between the chain links is excluded. The resilient wall 6 and the rigid wall 5 in the embodiment shown are laterally connected via the two side walls 18 and 19. These side walls 18 and 19 are spaced apart exactly in the length of the component 4 to be accommodated. Rigid wall 5, along the majority of its length, has a U-spaced recess 20, so that the component to be accommodated is urged against the lateral sections 5a and 5b of wall 5 only.

On the outside of side walls 18 and 19, there are arranged elongate projections 21 and 22 in the longitudinal direction of the chain, which serve for guiding the chain links. These projections 21 and 22 are arranged at the same level as pins 15 mutually connecting the chain links, and in the width thereof approximately correspond to the diameter of the pins 15. The pins 15 project beyond the outsides of lateral arms 12, 13 to such an extent that the face side thereof is flush with the outside of projections 21, 22.

In an embodiment not shown in the drawings, there are provided no side walls 18, 19 and rigid wall 5 as well as resilient wall 6 are connected via the projections 21, 22 only.

The exact positioning of the chain links in the tool takes place by means of pins 15 that are made of metal. In contrast thereto, the remainder of the chain links is made by inexpensive plastics injection molding. Due to guiding and positioning on the projecting sections of the metal pins 15, wear on the plastics body is avoided, and particle formation due to wear, involving great problems in the production of electronic components, is eliminated.

Figure 4:
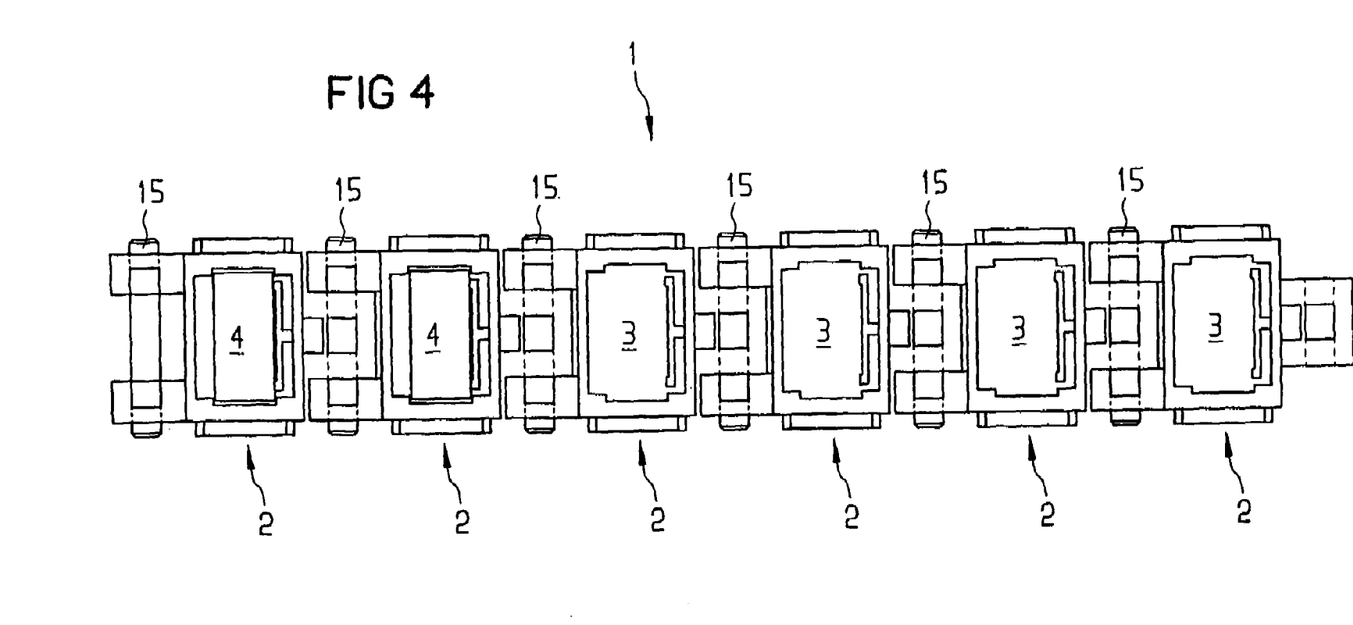
FIG. 4 shows a top plan view of a form chain consisting of chain links according to FIG. 1.

FIG. 4 illustrates a form chain in a top plan view, with the form chain consisting of chain links as described with reference to FIGS. 1 to 3. This form chain 1 is a vertically deflectable form chain, i.e. the pins 15 are arranged perpendicularly to the direction of insertion of the components 4 in the accommodation cavities 3.

Figure 5:
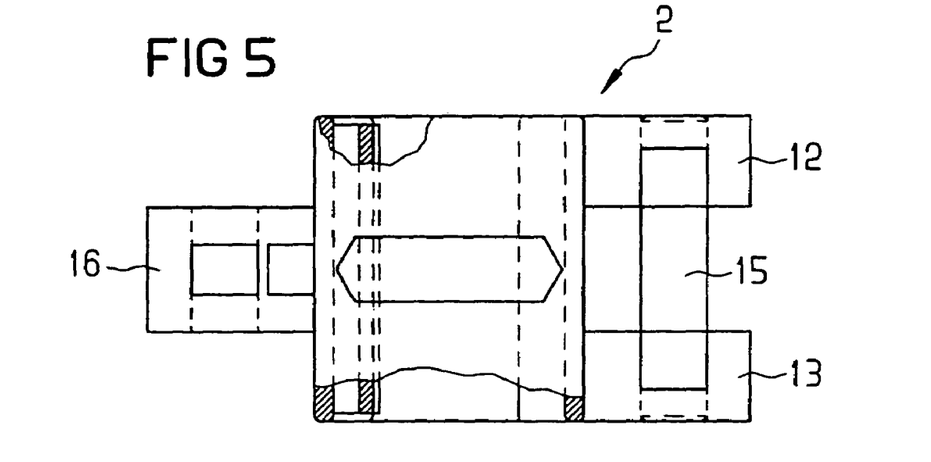
FIG. 5 shows a side view of a chain link in which the direction of insertion of the components to be accommodated is parallel to the connecting axles of the adjacent chain link.
Figure 6:
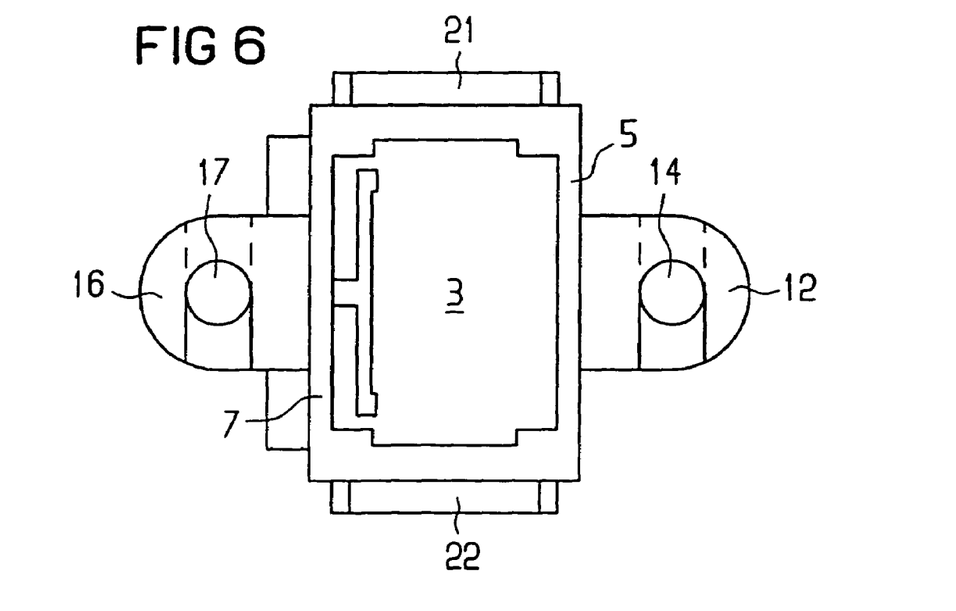
FIG. 6 shows a top plan view of the chain link according to FIG. 5, FIGS. 7 and 8 show a top plan view and a side view, respectively, of a chain link adapted to be connected to the adjacent chain link via two mutually perpendicular pivot axles.

FIGS. 5 and 6 show a side view and a top plan view, respectively, of a chain link of a horizontal form chain. The essential difference from the chain links shown in FIGS. 1 to 4 resides in that the connecting pin 15 (shown in FIG. 5) extends in the direction of insertion of a component 4 in the accommodation cavity. The lateral arms 12, 13 thus are arranged above each other on rigid wall 5. The bore 17 in the central arm 16 arranged on the opposite outer wall 7 also extends in the direction of insertion of a component in the accommodation cavity 3, so that the central arm 16, upon mating of chain links 2, can be received between the lateral arms 12, 13. In this embodiment, the pin 15 is not arranged to be projecting beyond the lateral arms 12, 13, so that fixing of the chain links 2 in the tool takes place via the lateral projections 21 and 22 only. All other features are analogous to the chain link described in FIGS. 1 to 4.

A horizontal form chain consisting of chain links as described in FIGS. 5 and 6 can be bent in horizontal direction and thus may easily be passed to processing stations distributed in a room.

FIGS. 7 to 11 shows the constituent parts of a form chain 1 with two pivot axles or pins 15a and 15b as well as part of the form chain proper. All features corresponding to the form chain according to FIGS. 1 to 4 bear the same reference numerals and will not be described in the following. The form chain with two pivot pins consists of chain links 2 (cf. FIGS. 7 an 8) and connecting pieces 23 (cf. FIGS. 9 and 10) which are inserted between the chain links 2 upon assembly of the form chain. The chain links 2 on one side thereof receive the pin 15a transversely to the direction of insertion of the small components 4 in the accommodation cavity 3 and on the opposite side thereof receive the pin 15b perpendicularly to said direction of insertion of the small components 4 in the accommodation cavity. In the embodiment shown, the lateral arms 12a and 13a on the side of rigid wall 5 are arranged so as to receive pin 15a transversely to the direction of insertion in accommodation cavity 3, whereas on the side of resilient wall 6 on outer wall 7, the lateral arms 12b and 13b are arranged above each other so that they can receive the connecting pin 15b in the direction of insertion in the accommodation cavity. The connecting piece 23 shown in FIGS. 9 and 10 consists of two halves 23a and 23b that are mutually identical, but connected to each other in a manner displaced by 90°. Each of the connecting halves 23a and 23b has a bore 24a and 24b, respectively, through which the pins 15a and 15b, respectively, are introduced upon assembly of the form chain.

In the embodiment shown, the lateral arms 12a and 13a are spaced apart by the same distance as lateral arms 12b and 13b. Due to this, the two halves 23a and 23b of the connecting piece can be formed in identical manner and just need to be offset from each other by 90°.

However, it is just as well possible to space the lateral arms 12a and 13a as shown in FIG. 2 and to form the connecting piece 23a correspondingly wider.

Figure 7:
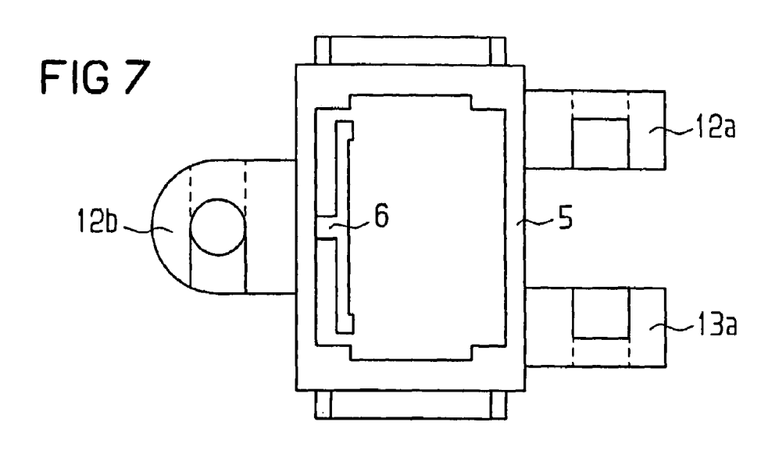
Figure 8:
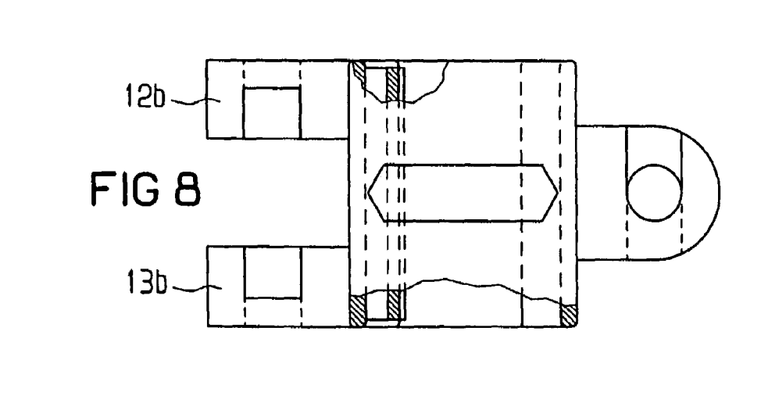
Figure 9:
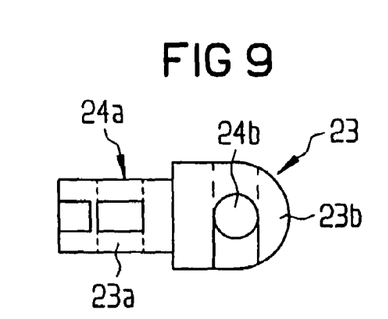
FIGS. 9 and 10 show a side view and a top plan view, respectively, of a connecting piece inserted between the chain links according to FIGS. 7 and 8 to form a form chain.
Figure 10:
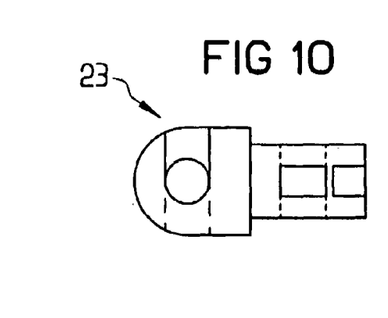
Figure 11:
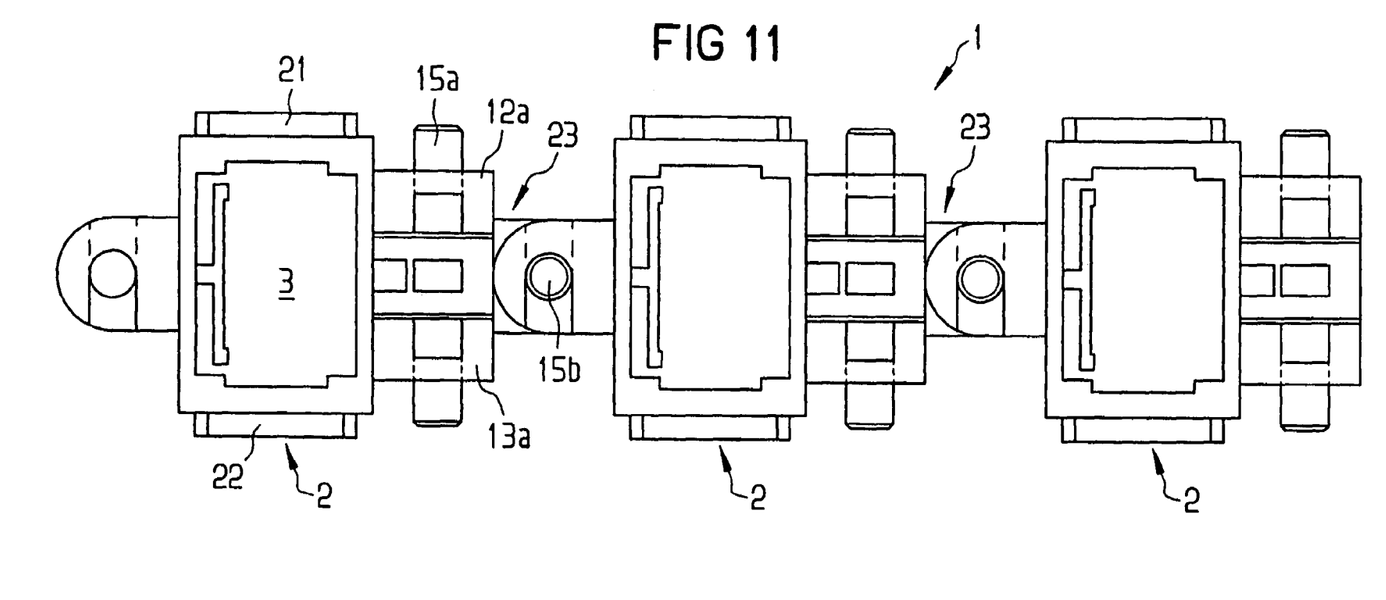
FIG. 11 shows a top plan view of a form chain having mutually perpendicular pivot axles along with chain links according to FIGS. 7 and 8 and connecting pieces according to FIGS. 9 and 10, FIGS. 12 and 13 show a sectional side view and a top plan view, respectively, of a chain link having a modified pivot axle construction and component fixation.

FIG. 11 shows the form chain with the chain links according to FIGS. 7 and 8 and the connecting piece according to FIGS. 9 and 10 in the assembled state. The half 23a of the connecting piece is received between lateral arms 12a and 13a, and the other half 23b is received between lateral arms 12b and 13b of the adjacent connecting piece. By insertion of the pins 15a and 15b, the chain links are fixedly connected to each other so as to be pivotable about pins 15a and 15b, respectively.

The pins 15a laterally project beyond the outsides of the lateral arms 12a and 13a to such an extent that the end faces are aligned with the outside of projections 21 and 22. This form chain, which is double-deflectable, thus may also be guided via the projections 21, 22 and the pins 15a.

FIGS. 12 to 15 show an additional embodiment of a vertically deflectable form chain. Features corresponding to those of the form chains described hereinbefore bear the same reference numerals and shall not be elucidated in more detail. The chain links of this form chain, on the side of rigid wall 5, are provided as well with two lateral arms 12, 13 having respective bores 14. On the opposite side, the chain link has two additional lateral arms 25, 26 which, with respect to their position, are arranged internally of the lateral arms 12, 13 and have circular axle-type projections 27 on the outside thereof which upon mating of the chain links engage the bores 14 of lateral arms 12, 13 of the adjacent chain link from the inside thereof. The end faces of lateral arms 12, 13 are each formed with a slope 28 extending inwardly. Upon mating of the chain links, the slope 28 rides onto the axle-type projections 27, whereby the lateral arms 12, 13 are resiliently bent outwardly and the axle-type projections 27 may latchingly engage the bores 14. In this embodiment the resilient wall 6 consists of two resilient arms 31 which at the lower end thereof are fixedly connected to outer wall 7 and the upper end of which urges the component 4 against the opposite rigid wall 5. The resilient arms 31, at the upper inside thereof, are provided with a bead 29 exerting pressure on the outside of the component 4.

Figure 12:
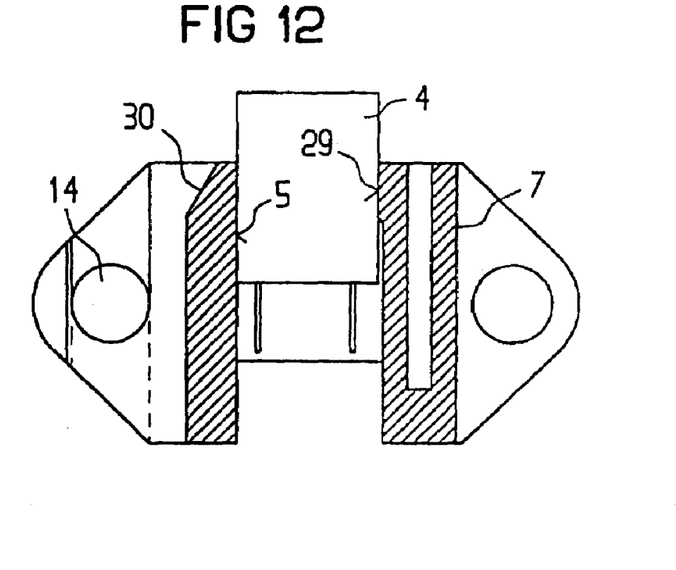
Figure 13:
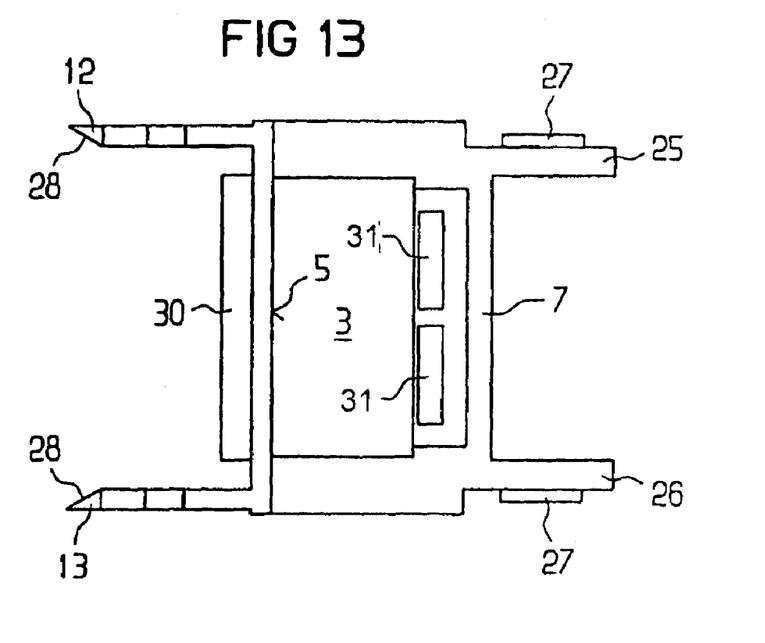
Figure 14:
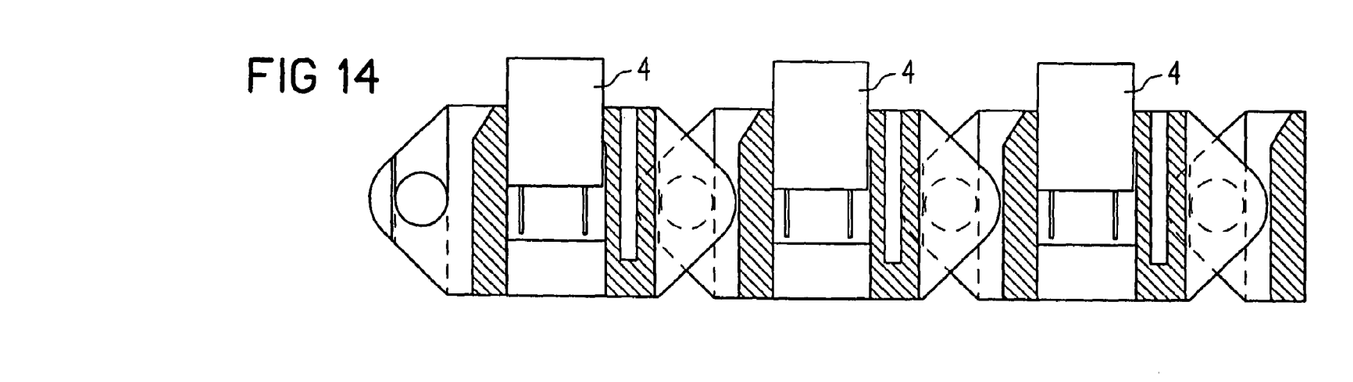
FIGS. 14 and 15 show a sectional side view and a top plan view, respectively, of a form chain having chain links according to FIGS. 12 and 13.
Figure 15:
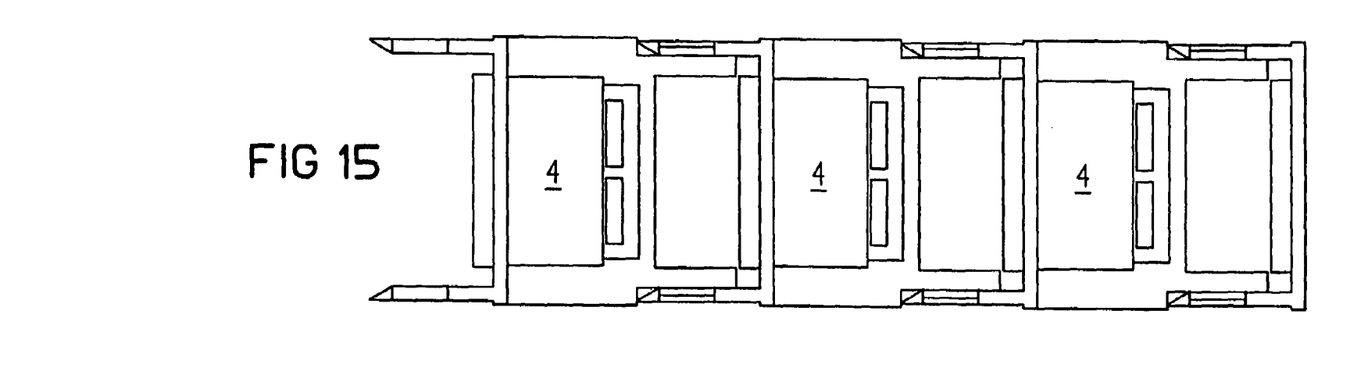

For centering the chain link in a processing station, the outside of stationary wall 5 is formed with a slope 30 at which the centering means of the tool engages, thereby exactly determining the position of the chain link in the tool.

The invention is not restricted to the embodiments shown. For example, it is also possible to employ the resilience feature depicted in the preceding embodiments in the form chain according to FIGS. 12 to 15.

The invention claimed is:

1. A transport system for small components, in particular electrical components, which are arranged in series in said transport system, comprising a form chain having an arbitrary number of chain links in which the small components are accommodated and each said chain link has one accommodation cavity formed therein having at least two walls, one of said walls being rigid and a wall opposite thereto being resilient wherein the resilient wall comprises a central web extending in a direction of insertion of the small components and a plurality of straight resilient arms laterally extending from said central web and each said straight resilient arm is configured to urge the small component against the rigid wall when the cavity accommodates the small component.

2. A transport system according to claim 1, wherein the form chain comprises chain links with different accommodation cavities for different components or component stages.

3. A transport system according to claim 1, wherein the resilient arms extend over a full height of the accommodation cavity and on outer ends thereof each have a bead directed towards an inside of said cavity.

4. A transport system according to claim 1, wherein the resilient wall consists of an outer wall and two resilient arms, said resilient arms, being connected at a bottom side thereof to an outer wall and, at upper ends thereof, being freestanding and resilient.

5. A transport system according to claim 4, wherein an outside of the rigid wall opposite the resilient wall has a slope.

6. A transport system according to claim 1, wherein the accommodation cavity is designed as through opening.

7. A transport system according to claim 1, wherein the chain links are pivotable about a pin transversely to a direction of insertion of the small components in the accommodation cavity.

8. A transport system according to claim 7, wherein on sides of the accommodation cavities extending in the longitudinal direction of the chain, there are formed projections on both sides thereof extending in the longitudinal direction, which have a width corresponding to the diameter of the pin and in the longitudinal direction thereof are arranged at a level of said pin.

9. A transport system according to claim 1, wherein the chain links are pivotable about a pin perpendicularly to a direction of insertion of the small components in the accommodation cavity.

10. A transport system according to claim 1, wherein the chain links are connected via two pins arranged perpendicularly to each other.

11. A transport system according to claim 1, wherein each said chain link on one side thereof has two lateral arms with bores and on an opposite side thereof has a central arm with a bore for accommodating a pin.

12. A transport system according to claim 11, wherein the pin is made of metal.

13. A transport system according to claim 11, wherein the pins project laterally beyond the lateral arms.

14. A transport system according to claim 1, wherein the chain links are made by plastics injection molding.

15. A transport system according to claim 1, wherein the chain links, on one side thereof, have two lateral arms with bores and, on opposite side thereof, have two lateral arms with axle-type projections, said axle-type projections latchingly engaging said bores upon assembly of said chain links.

16. A transport system according to claim 1, wherein a height of the accommodation cavity corresponds at least to a height of the components to be accommodated.

17. A transport system for small components, in particular electrical components, which are arranged in series in said transport system, comprising a form chain having an arbitrary number of chain links in which the small components are accommodated and which each have at least one accommodation cavity formed therein having at least two walls each where one of said at least two walls is rigid and the wall located opposite thereto is resilient, wherein, said chain links are linked one to another about link pins, wherein some of said pins are arranged in a parallel axis to said accommodation cavity and some are arranged transverse to said accommodation cavity and the resilient wall comprises a central web extending in a direction of insertion of the small components and a plurality of straight resilient arms laterally extending from said central web and each said straight resilient arm is configured to urge the small component against the rigid wall when the cavity accommodates the small component.

18. A transport system according to any of claim 17, wherein each said chain link on one side thereof has two lateral arms with bores and on an opposite side thereof has a central arm with a bore for accommodating said pin.

19. A transport system for small components, in particular electrical components, which are arranged in series in said transport system, comprising a form chain having an arbitrary number of chain links in which the small components are accommodated and each said chain link has one accommodation cavity formed therein having at least two walls, one of said walls being rigid and a wall opposite thereto being resilient wherein the resilient wall comprises an outer wall and a plurality of resilient arms, each of said resilient arms including a lower side and an upper side, said lower side being connected to the outer wall and said upper side being freestanding and resilient, wherein each of said resilient arms are configured to urge the small component against the rigid wall when the cavity accommodates the small component.

20. A transport system for small components, in particular electrical components, which are arranged in series in said transport system, comprising a form chain having an arbitrary number of chain links in which the small components are accommodated and each said chain link has one accommodation cavity formed therein having at least two walls, one of said walls being rigid and a wall opposite thereto being resilient wherein the resilient wall comprises a central web and a plurality of resilient arms extending laterally from the central web, the rigid wall and each of the resilient arms frictionally engaging the small component and retaining the small component within the cavity accommodating the small component.

* * * * *